(12) United States Patent
Bliss et al.

(10) Patent No.: US 8,724,963 B2
(45) Date of Patent: May 13, 2014

(54) METHOD AND SYSTEM FOR GESTURE BASED SEARCHING (75) Inventors: John Bliss, Boulder, CO (US); Gregory M. Keller, Boulder, CO (US)

(73) Assignee: Captimo, Inc., Boulder, CO (US)

( * ) Notice: Subject to any disclaimer, the term of this patent is extended or adjusted under 35 U.S.C. 154(b) by 0 days.

(21) Appl. No.: 13/484,210

(22) Filed: May 30, 2012

(65) Prior Publication Data

US 2012/0239642 A1  Sep. 20, 2012

Related U.S. Application Data

(63) Continuation of application No. PCT/US2012/033373, filed on Apr. 12, 2012, which is a continuation-in-part of application No. 12/973,677, filed on Dec. 20, 2010.

(60) Provisional application No. 61/474,557, filed on Apr. 12, 2011, provisional application No. 61/287,817, filed on Dec. 18, 2009.

(51) Int. Cl.
*G06F 17/30* (2006.01)

(52) U.S. Cl.
USPC .......................................... 386/239; 707/722

(58) Field of Classification Search
None
See application file for complete search history.

(56) References Cited

U.S. PATENT DOCUMENTS

| | | | |
|---|---|---|---|
| 6,567,980 B1 | 5/2003 | Jain et al. | |
| 7,769,819 B2 | 8/2010 | Lerman et al. | |
| 8,327,295 B2 | 12/2012 | Ikeda et al. | |
| 8,341,558 B2 | 12/2012 | Li | |
| 8,478,777 B2 | 7/2013 | Li et al. | |
| 8,542,205 B1 | 9/2013 | Keller | |
| 8,558,759 B1 | 10/2013 | Prada Gomez et al. | |
| 8,589,374 B2 | 11/2013 | Chaudhri | |
| 2002/0006222 A1* | 1/2002 | Inagaki et al. | 382/181 |
| 2002/0099694 A1* | 7/2002 | Diamond et al. | 707/3 |
| 2003/0161610 A1 | 8/2003 | Miyazawa et al. | |
| 2004/0177319 A1* | 9/2004 | Horn | 715/501.1 |
| 2004/0192354 A1 | 9/2004 | Sawano | |
| 2004/0218902 A1 | 11/2004 | Yanagita | |
| 2005/0044499 A1 | 2/2005 | Allen et al. | |
| 2007/0277205 A1* | 11/2007 | Grannan | 725/80 |
| 2008/0059535 A1* | 3/2008 | Lindsley et al. | 707/200 |
| 2008/0229205 A1 | 9/2008 | Lee et al. | |
| 2008/0235621 A1 | 9/2008 | Boillot | |
| 2009/0115862 A1 | 5/2009 | Andersson | |
| 2009/0153492 A1 | 6/2009 | Popp | |
| 2009/0172546 A1 | 7/2009 | Chang et al. | |
| 2009/0287650 A1 | 11/2009 | Cha | |

(Continued)

FOREIGN PATENT DOCUMENTS

KR   10-2005-0010935 A   1/2005

OTHER PUBLICATIONS

H. Meng et al., "WebClip a WWW Video Editing/Browsing System," IEEE First Workshop on Multimedia Signal Processing, Jun. 23-24, 1997.

(Continued)

*Primary Examiner* — Hung Dang
*Assistant Examiner* — Sunghyoun Park
(74) *Attorney, Agent, or Firm* — Bryan Cave LLP (57) ABSTRACT

Some embodiments include a method for gesture based search. Other embodiments of related methods and systems are also disclosed.

22 Claims, 7 Drawing Sheets

(56) References Cited

U.S. PATENT DOCUMENTS

| | | |
|---|---|---|
| 2010/0005428 A1 | 1/2010 | Ikeda et al. |
| 2010/0077003 A1* | 3/2010 | Kondo et al. .................. 707/780 |
| 2010/0095329 A1 | 4/2010 | Tran et al. |
| 2010/0095345 A1 | 4/2010 | Tran et al. |
| 2010/0251286 A1 | 9/2010 | Ahn et al. |
| 2011/0055753 A1 | 3/2011 | Horodezky et al. |
| 2011/0066984 A1 | 3/2011 | Li |
| 2011/0131299 A1 | 6/2011 | Sardary |
| 2012/0005632 A1 | 1/2012 | Broyles, III et al. |
| 2012/0044179 A1 | 2/2012 | Hudson |
| 2012/0089582 A1 | 4/2012 | Kumar et al. |
| 2012/0089952 A1 | 4/2012 | Song et al. |
| 2012/0174041 A1 | 7/2012 | Queru |
| 2012/0174043 A1 | 7/2012 | Queru |
| 2012/0197857 A1 | 8/2012 | Huang et al. |
| 2012/0293421 A1 | 11/2012 | Santoro |
| 2013/0006957 A1 | 1/2013 | Huang et al. |
| 2013/0085848 A1 | 4/2013 | Dyor et al. |

OTHER PUBLICATIONS

ISR and Written Opinion for corresponding Int'l Application No. PCT/US2010/061363 dated Sep. 28, 2011.

ISR and Written Opinion for corresponding Int'l Application No. PCT/US2012/028346 dated Oct. 12, 2012.

ISR and Written Opinion for corresponding Int'l Application No. PCT/US2012/033373 dated Aug. 31, 2012.

* cited by examiner

METHOD AND SYSTEM FOR GESTURE BASED SEARCHING

CROSS-REFERENCE TO RELATED APPLICATIONS

This application is a continuation of International Patent Application No. PCT/US2012/033373, filed on Apr. 12, 2012, which claims the benefit of U.S. Provisional Application No. 61/474,557, filed Apr. 12, 2011. Further, this application is a continuation-in-part application of U.S. patent application Ser. No. 12/973,677, filed Dec. 20, 2010, which claims the benefit of U.S. Provisional Application No. 61/287,817, filed Dec. 18, 2009. U.S. Provisional Application No. 61/474,557, U.S. Provisional Application No. 61/287,817, U.S. patent application Ser. No. 12/973,677, and International Patent Application No. PCT/US2012/033373 each are incorporated by reference herein in their entirety.

FIELD OF THE INVENTION

This invention relates generally to searching for media, and relates more particularly to gesture based searching for media.

DESCRIPTION OF THE BACKGROUND

The emergence of social networking and/or social media ushers in an exciting frontier for users across the globe. Social networking and/or social media are able to bring together networked users for purposes of interaction utilizing a variety of media types and data as payloads for communication. In particular, video is one form of media having an unprecedented level of growth in use by socially networked constituents for purposes of social interaction and/or for "conveying the point." This growth has been driven, at least in part, by advances in technology such as increased network bandwidth technology and, to an even greater extent, by advances in mobile electronic device technology, permitting users of mobile electronic devices to easily (a) capture and upload video to one or more video hosting services and/or social networks and/or (b) share the video with others via the video hosting service(s) and/or the social network(s).

However, given the ease by which video (as well as other media) can now be generated and shared, the amount of data (e.g., media) any user(s) are required to consume daily in a social networking-driven and/or social media-driven society is reaching staggering proportions. Time management of such data is becoming increasingly important for the user(s) accessing video hosting service(s) and/or social network(s) across one or more communication platforms. Of the various media the user(s) survey daily, surveying video media accounts are consuming a substantial portion of the time of the user(s). As such, the user(s) spend increasing amounts of time viewing one or more video "haystacks" that have no relation to other pieces of information in order to search for and find a specific data "needle" that represents the important details of the video relative to the particular user(s), such as, for example, with respect to social interaction. For example, little may be known about the inner content of a video, and how and where other social networking users are engaging with that video.

Furthermore, searching for the specific data "needle" can be needlessly complicated via certain electronic devices, such as, for example, via mobile electronic devices. For example, using text based input to search for particular data can be suitable when the electronic device comprises a personal computer including a full size keyboard. However, with many electronic devices, particularly in the case of mobile electronic devices, a keyboard may be of a reduced size or entirely absent. Indeed, many electronic devices rely on other mechanisms for receiving input, including touch screen mechanisms.

Accordingly, a need or potential for benefit exists for a system and/or a method to facilitate the searching of media using a gesture based input as a means to improve the efficiency of searching for media in an input-limited environment.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a method of gesture based searching. At least part of the method can be implemented via execution of computer instructions configured to run at one or more processing modules and configured to be stored at one or more memory storage modules. The method can comprise: executing one or more first computer instructions configured to provide one or more search targets, the one or more search targets corresponding respectively to one or more search field categories; executing one or more second computer instructions configured to recognize one or more gestures, the one or more gestures being indicative of at least one first target of the one or more search targets; executing one or more third computer instructions configured to filter first media source metadata associated with a first media source based on at least one first category of the one or more search field categories to provide first filtered metadata of the first media source metadata, the at least one first category being associated with the at least one first target; and executing one or more fourth computer instructions configured to identify at least one second media source based upon the first filtered metadata. The computer instructions can comprise the first, second, third, and fourth computer instructions.

Various embodiments include a system. The system comprises a search module. The search module comprising a gesture recognition module, a target module, a filter module, and an identification module. The gesture recognition module can be configured to recognize one or more gestures. The target module can be configured to identify at least one first target of one or more search targets based on the gesture(s). Further, the search target(s) can correspond respectively to one or more search field categories. The filter module can be configured to filter first media source metadata associated with a first media source based on at least one first category of the one or more search field categories to provide first filtered metadata of the first media source metadata. Further, the at least one first category can be associated with the at least one first target. The identification module can be configured to identify at least one second media source based upon the first filtered metadata.

Further embodiments include a method of providing a system. The method can comprise providing a search module, where providing the search module comprises: providing a gesture recognition module configured to recognize one or more gestures; providing a target module configured to identify at least one first target of one or more search targets based on the one or more gestures, the one or more search targets corresponding respectively to one or more search field categories; providing a filter module configured to filter first media source metadata associated with a first media source based on at least one first category of the one or more search field categories to provide first filtered metadata of the first media source metadata, the at least one first category being associated with the at least one first target; and providing an identification module configured to identify at least one second media source based upon the first filtered metadata.

Figure 1:
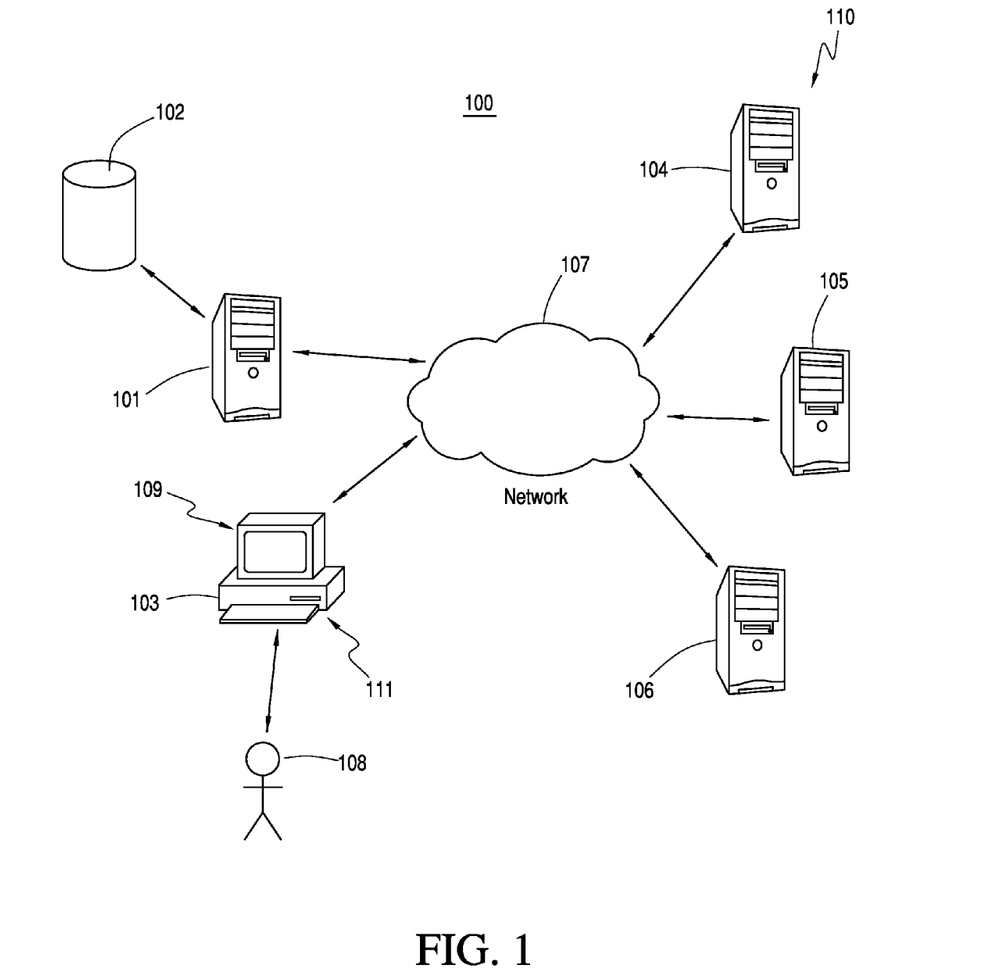
FIG. 1 illustrates a system, according to an embodiment.

Turning to the drawings, FIG. 1 illustrates system 100, according to an embodiment. System 100 is merely exemplary and is not limited to the embodiments presented herein. System 100 can be employed in many different embodiments or examples not specifically depicted or described herein.

System 100 and/or search module 101 can be implemented to provide gesture based searching for media, such as, for example, using object association within the media. For example, the objects can be associated with particular moments of time in the media. U.S. patent application Ser. No. 12/973,677, filed on Dec. 20, 2011 and entitled "Method and System for Associating an Object to a Moment in Time in a Digital Video" discloses systems and methods for associating one or more objects to a moment in time in media (e.g., video data) that can be used with and/or as part of system 100 and/or search module 101.

Accordingly, system 100 and/or search module 101 can facilitate searching for other media (e.g., one or more second media sources) related to one or more first media (e.g., one or more first media sources). In some embodiments, system 100 can permit user(s) 108 to search based on a specific reference point (e.g., a frame and/or a moment in time) in the media. For purposes of illustration, media is frequently referenced herein with respect to video data. That is, system 100 is frequently referenced as being implemented to provide gesture based searching for one or more second video data that is related to one or more first video data. Nonetheless, for various embodiments of system 100, media can refer to any suitable medium of communication including, for example, video data, audio data, image data, text data, etc. and/or any suitable combination thereof. In various embodiments, video data can comprise image data stored as a sequence and presented at regularly spaced time intervals (e.g., 50 frames per second) to provide dynamic imagery.

System 100 comprises search module 101. In many embodiments, system 100 can also comprise database 102, user electronic device 103, at least one input device 111, at least one output device 109, at least one networked electronic device 110 (e.g., networked electronic device 104, networked electronic device 105, and/or networked electronic device 106), and/or communication network 107. In other embodiments, at least one of user electronic device 103, input device(s) 111, output device(s) 109, networked electronic device(s) 110, and/or communication network 107 can be separate from system 100 and/or search module 101. Further, networked electronic device(s) 110 are shown as comprising three networked electronic devices (e.g., networked electronic device 104, networked electronic device 105, and/or networked electronic device 106) at FIG. 1 for purposes of illustration only and can comprise any suitable number of one or more electronic devices networked in a wireless and/or wired manner.

User electronic device 103 can comprise (a) one or more of output device(s) 109, (b) one or more of input device(s) 111, and/or (c) search module 101. In other embodiments, (a) one or more of output device(s) 109, (b) one or more of input device(s) 111, and/or (c) search module 101 can be separate from user electronic device 103. In some embodiments, user electronic device 103 and/or search module 101 can comprise database 102. In other embodiments, database 102 can be separate from user electronic device 103 and/or search module 101. For example, in various embodiments, where database 102 is separate from user electronic device 103 and/or search module 101, a central computer system, as described further below, can comprise database 102.

Search module 101 can be implemented as software and/or hardware. Where user electronic device 103 comprises search module 101, at least part of search module 101 can comprise software configured to operate at user electronic device 103. Nonetheless, in these embodiments, at least another part of search module 101 can be operated remotely from user electronic device 103, such as, for example, at the central computer system. Further in these embodiments, an operator of system 100, as opposed to user(s) 108 of system 100, can operate and/or administrate the central computer system. Accordingly, as desirable, the central computer system can be implemented for one or more of processing purposes, data population and/or storage purposes.

In many embodiments, user electronic device 103 can be implemented as a user computer system, and/or one or more networked electronic devices of networked electronic device(s) 110 can be implemented as one or more networked computer systems, respectively. In these embodiments, as applicable and/or desirable, the user computer system, the central computer system, and/or one or more of the networked computer system(s) can be similar or identical to computer system 900 (FIG. 9), as described below. Accordingly, although in some examples user electronic device 103 can comprise any electronic device suitable for implementing search system 100, in many examples, user electronic device 103 comprises a mobile electronic device. Mobile electronic device can refer to at least one of a digital music player, a digital video player, a digital music and video player, a cellular telephone (e.g., smartphone), a personal digital assistant, a handheld computer system (e.g., a tablet computer system), a laptop computer system, or another electronic device with the capability to provide media. In a more specific example, the mobile electronic device can comprise the iPod® or iPhone® or iTouch® or iPad® product by Apple Inc. of Cupertino, Calif. Likewise, the mobile electronic device can comprise a Blackberry® product by Research in Motion (RIM) of Waterloo, Ontario, Canada, or a different product by a different manufacturer. Further, the mobile electronic device can comprise a product using the Android operating system developed by the Open Handset Alliance led by Google Inc. of Mountain View, Calif., such as, for example, the Razr and Droid products by Motorola, Inc. of Schaumburg, Ill. In these or other embodiments, the networked electronic device(s) can also comprise one or more mobile electronic devices.

Figure 9:
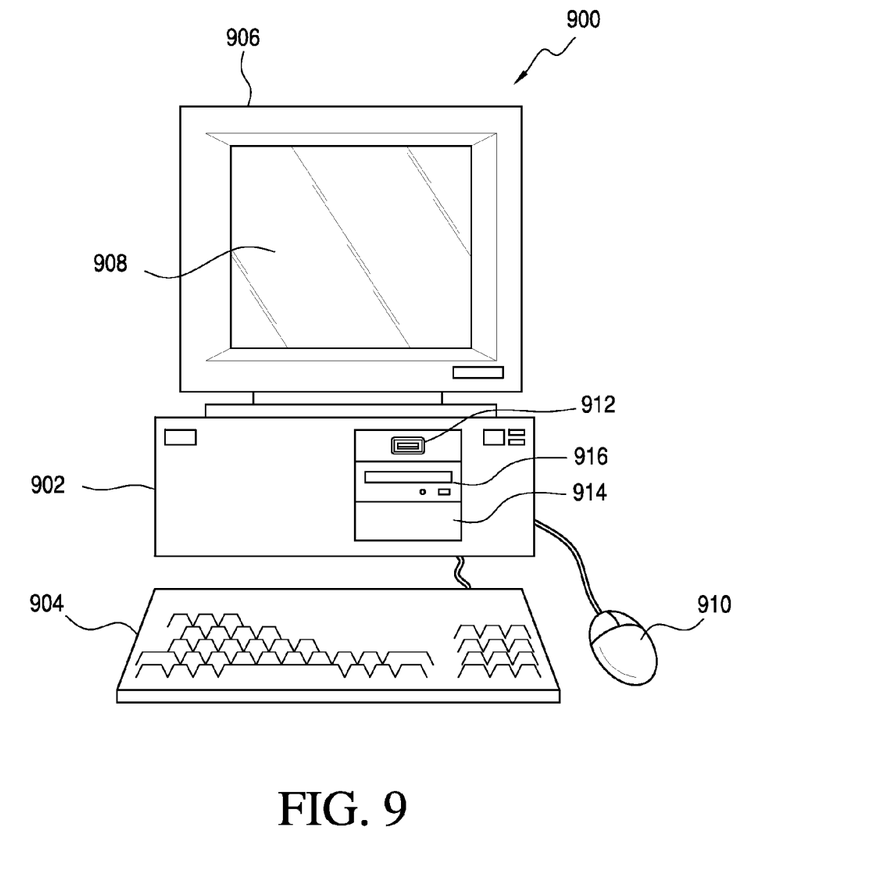
FIG. 9 illustrates a computer that is suitable for implementing an embodiment of a user electronic device, one or more networked electronic devices, a central computer system, and/or one or more cloud computer systems of the system of FIG. 1.

In further embodiments, some or all of the functionality of user electronic device 103 can alternatively or additionally be implemented as a user application programmable interface (e.g., via cloud computing). As an example, the user application programmable interface can communicate (e.g., via communication network 107) with one or more cloud computer systems, and can be operated (e.g., in the capacity of an interface only) at one or more processors and/or stored at one or more memory storage modules of user electronic device 103 while the remaining functional aspects of user electronic device 103, as described herein, are operable at one or more processors and/or storable at one or more memory storage modules of the cloud computer system(s). Accordingly, the cloud computer system(s) can each also be similar or identical to computer system 900 (FIG. 9). For convenience of illustration, user electronic device 103 is generally described herein with respect to user electronic device 103 only, but in many embodiments, reference to user electronic device 103 can mean user electronic device 103 and/or the user application programmable interface.

Likewise, some or all of the functionality of networked electronic device(s) 110 can alternatively or additionally be implemented respectively as one or more networked application programmable interfaces (e.g., via cloud computing). As an example, the networked application programmable interface(s) can communicate (e.g., via communication network 107) with the cloud computer system(s), and can be operated (e.g., in the capacity of one or more interfaces only) at one or more processors and/or stored at one or more memory storage modules of networked electronic device(s) 110, respectively, while the remaining functional aspects of networked electronic device(s) 110, as described herein, are operable at the one or more processors and/or storable at the one or more memory storage modules of the cloud computer system(s). For convenience of illustration, networked electronic device(s) 110 are generally described herein with respect to networked electronic device(s) 110 only, but in many embodiments, reference to networked electronic device(s) 110 can mean networked electronic device(s) 110 and/or the networked application programmable interface(s).

Further still, some or all of the functionality of the central computer system can alternatively or additionally be implemented as a central application programmable interface (e.g., via cloud computing), in similar fashion to the relationship of user electronic device 103 to user application programmable interface and the cloud computer(s) but with respect to the central computer system. To maintain convenience of illustration, the central computer system is generally described herein with respect to the central computer system only, although in some embodiments, the central computer system can refer to the central computer system and/or the central application programmable interface.

Input device(s) 111 can comprise any device(s) suitable for providing inputs to system 100, search module 101, and/or user electronic device 103. For example, input device(s) 111 can comprise pointing device(s), keyboard(s), track pad(s), touch screen(s), camera(s), sensor(s) (e.g., motion detector(s)), microphone(s) configured for voice recognition, etc.

Output device(s) 109 can comprise any device(s) suitable for providing and/or presenting media (e.g., a first media source and/or a second media source, as described further below) to user(s) 108 of system 100 and/or search module 101. For example, output device(s) 109 can comprise electronic display(s), loudspeaker(s), etc. in some embodiments, one or more of input device(s) 111 can be part of one or more of output device(s) 109, and vice versa.

Database 102 can be configured to receive media (e.g., one or more second media sources) via communication network 107, such as, for example, from networked electronic device(s) 110 and to populate and/or store the media. Database 102 can be implemented using a database management system such that database 102 comprises a database system. For example, database 102 can be implemented using one or more of an XML (Extensible Markup Language) database, MySQL, an Oracle® database management system, or any other suitable database management system.

Search module 101, user electronic device 103 and/or networked electronic device(s) 110 can be configured to communicate with each other, such as, for example, via communication network 107. Where applicable, search module 101 and/or user electronic device 103 can also be configured to communicate with output device(s) 109 via communication network 107. Communication network 107 can comprise (a) one or more components configured to provide wired communication (e.g., one or more data buses, such as, for example, universal serial bus(es); one or more networking cables, such as, for example, coaxial cable(s), optical fiber cable(s), and/or twisted pair cable(s); any other suitable data cable, etc.) and/or (b) one or more components configured to provide wireless communication (e.g., one or more radio transceivers, one or more infrared transceivers, etc.). Further, communication network 107 can be configured to operate using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The components forming the communication network can be dependent on the network topologies and/or protocols in use, and vice versa. In specific examples, communication network 107 can comprise the Internet.

Search module 101, user electronic device 103, networked electronic device(s) 110, database 102, and/or where applicable, the central computer system, can be configured to host media and/or metadata. Some or all of the media and/or metadata can be accessible to user(s) 108 via communication network 107, such as, for example, using system 100, search module 101, and/or user electronic device 103. Metadata can comprise information describing media. For example, metadata can comprise data stored within a media source describing such items as participants, geo-location, time, format, etc. Metadata need not be stored within the media source. Rather, the metadata could also (or instead) be stored at a remote location linked to the media file, such as, for example, at a database (e.g., database 102).

For example, user(s) 108 can use user electronic device 103 to access media that is hosted at one of networked electronic device(s) 110. In particular, electronic device 103 can be configured to retrieve, traverse, and present media (e.g., streaming video data, web pages having video data, and networked video data) and/or related metadata via communication network 107. For instance, a video player, a web browser or any suitable media system can be used at user electronic device 103 to access the media and/or metadata. Further, user electronic device 103 can be configured to provide and/or present the media to user(s) 108 via output mechanism(s) 109. In various examples where output mechanism(s) 109 comprise an electronic display, the media can be provided and/or presented to user(s) 108 at the electronic display. Further still, where the media comprises video data, the video data can be displayed at the electronic display (e.g., at a window of the electronic display and/or at a full screen of the electronic display, as embedded in another application format, and/or as part of a website). For instance, many websites offer media hosting services to users of the websites (e.g., user(s) 108) via communication network 107. Consequently, user(s) 108 can access one or more websites via user electronic device 103 to access media and/or metadata.

Furthermore, user(s) 108 can use user electronic device 103 to use search module 101 to search for other media (e.g., second media source(s)) that relate to the first media (e.g., first media source(s)). The first media and/or the other media can be provided by networked electronic device(s) 110, search module 101, and/or user electronic device 103. In many embodiments, search module 101 can catalogue media and/or metadata from any number of sources (e.g., websites, social networks, etc.) and generate and/or populate database 102 with information based thereon.

In a more detailed example, using system 100 and/or search module 101, user(s) 108 can view video data on a third party video hosting website (e.g., YouTube®, Facebook®, Twitter®, etc.) and search for a related videos. Instead of searching based on a textually input search term, user(s) 108 can perform one or more gestures, as described further below, to control and/or inform the search.

Figure 2:
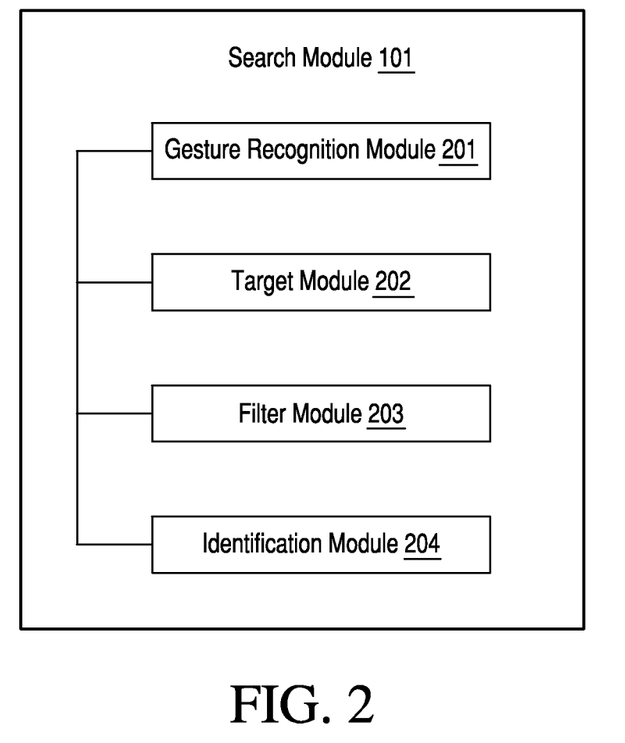
FIG. 2 illustrates a block diagram of a search module, according to an embodiment of the system of FIG. 1.

Turning ahead now in the drawings, FIG. 2 illustrates a block diagram of search module 101, according to an embodiment of system 100. Search module 101 (FIG. 1) can comprise gesture recognition module 201, target module 202, filter module 203, and/or identification module 204. Gesture recognition module 201, target module 202, filter module 203, and/or identification module 204 can be configured to communicate and/or cooperate with each other to provide the functionality of search module 101 (FIG. 1). As mentioned previously, parts of search module 101 (FIG. 1) can be located remotely from each other such that one or more of gesture recognition module 201, target module 202, filter module 203, and/or identification module 204 can be configured to communicate with another one or more of gesture recognition module 201, target module 202, filter module 203, and/or identification module 204 via communication network 107 (FIG. 1).

Gesture recognition module 201 can be configured to recognize one or more gestures, such as, for example, gesture(s) provided by user(s) 108. For example, the gesture(s) can comprise one or more sensor-based inputs. For example, the sensor-based input(s) can comprise at least one motion-based input (e.g., (a) movement detected across a touch screen, such as, for example, dragging an object (e.g., a media source, a thumbnail of the media source, etc.) to a search target location (e.g., a search icon), forming a shape, etc., (b) movement in front of a motion detector such as pointing to a search target location, (c) movement of a motion sensitive device, such as, for example, a mouse, an accelerometer, etc., (d) facial expressions, such as, for example, expressions of the mouth and/or movement, focus point(s), and/or shape of the eyes, etc., (e) keystroke movements (i.e., not the actual key inputs, but the movement of the fingers), (f) tapping (e.g., double-tapping) a touch screen, etc.), and/or at least one voice-based input (e.g., spoken commands). In some embodiments, motion-based inputs can also comprise input through lack of motion (e.g., pressing a touch screen without moving). Further, in other embodiments, motion-based inputs can also comprise dragging multiple media sources together. In many embodiments, gesture recognition module 201 can be configured to communicate with input device(s) 111 (FIG. 1) in order to receive the gesture(s) sensed, detected, and/or received from input device(s) 111 (FIG. 1).

Target module 202 can be configured to identify at least one first target of one or more search targets based on the gesture(s). Further, the search target(s) can correspond respectively to one or more search field categories. The search target(s) can take on various meanings depending on the gesture(s). For example, where the gesture(s) comprise motion-based inputs such as movements across a touch screen, the search target(s) can comprise physical locations (e.g., search icons) on the touch screen. By dragging first media at the touch screen to one or more of these physical locations, user(s) 108 (FIG. 1) can indicate one or more capacities by which search module 101 (FIG. 1) can proceed to search for other media, as illustrated further at FIGS. 3-5. In further examples, the physical location(s) of the search target(s) can be other first media. That is, by dragging multiple first media together, user(s) 108 (FIG. 1) can prompt search module 101 (FIG. 1) to initiate searching for media relevant to shared characteristics of the multiple first media or aggregate characteristics of the multiple first media, as determined by the respective first media metadata of the multiple first media. Meanwhile, where the gesture(s) comprise voice-based inputs such as spoken commands, the search target(s) can represent one or more predetermined search terms (e.g., location search, people search, time search, format search, etc.). In general, search target(s) can refer to one or more gesture outcomes that result in gesture recognition module 201 registering the sensory input as the gesture(s) as opposed to extraneous movement and/or noise.

In some embodiments, where target module 202 provides motion-based interactive search targets, target module 202 can provide the motion-based interactive search targets at one or more of output device(s) 109 whenever output device(s) 109 are providing media. In other embodiments, target module 202 can hide the motion-based interactive search targets until after user(s) 108 prompt target module 202 to reveal the motion-based interactive search targets, such as, for example, by providing one or more gestures indicative of a desire by user(s) 108 to conduct a gesture based search.

The search field categories can comprise predetermined search field categories in some examples, and can comprise custom or user-defined search field categories (e.g., based on user preferences, user search history, media source metadata, or other factors) in the same or other examples. Meanwhile, in many embodiments, user(s) 108 can search according to multiple search target(s), and in further embodiments, can prioritize certain search field categories over other search field categories, such as, for example, by searching multiple times. Accordingly, the original search field categories can be reorganized based on a weighting scheme.

Filter module 203 can be configured to filter first media source metadata associated with a first media source, such as, for example, to limit the first media source metadata to only relevant search metadata. For example, filter module 203 can filter the first media source metadata based on at least one first category of the one or more search field categories (e.g., location, time, people, format, etc.). By filtering the first media source metadata, filter module 203 can provide first filtered metadata of the first media source metadata. The one or more first categories can be associated with the first target(s). That is, if detection recognition module 201 detects the gesture(s) corresponding to a search target of target module 202 that corresponds to the search field category of "location," filter module 203 can filter the first media source metadata to location-related metadata of the first media source metadata.

In some embodiments, different reference points (e.g., time and/or frame) of media (e.g., first media source(s)) can have different metadata associated therewith. For example, a first reference point of the media could have metadata indicating a first location, first time, and/or first people, while another reference point could have second metadata indicating a second location, second time and/or second participants. In such an instance, filter module 203 could return the metadata related to the selected reference point (e.g., the first reference point, the second reference point, etc.) of the media, as applicable.

Identification module 204 can be configured to identify at least one second media source based upon the first filtered metadata. Specifically, identification module 204 can correlate the first filtered metadata to second metadata of second media source(s) in order to identify the second media source(s). Further, identification module 204 can be configured to receive an input of search parameters (e.g., a uniform resource identifier, a picture file, a video file, an audio file, etc.) and return a set of results that are relevant to the search parameters. For example, in some embodiments, identification module 204 can comprise a search engine. The search engine can comprise a general purpose search engine, such as Google® or Bing®, and/or a provider-specific search engine, such as Facebook® or YouTube®. The search engine can be located at one or more of networked electronic device(s) 110. These networked electronic device(s) of networked electronic device(s) 110 can be specifically configured to provide the relevant searching capabilities. However, the search engine can alternatively or additionally be located at user electronic device 103, the central computer, etc. In many instances, the search parameters consist of text entries, but other parameters are possible. For example, when a media file is sent, such as the picture, video, or audio, the search engine can perform an object recognition to recognize relevant details about the media file to be used in the search parameters. For example, if a picture of a mountain landscape is sent, the search engine could detect the mountain landscape and find similar results (e.g., other pictures with mountain landscapes). In many embodiments, the search engine can be used to identify the second media source(s).

In some embodiments, search module 101 can receive the first media source from user(s) 108 directly or indirectly from one or more respondents of user(s) 108. For example, system 100 and/or search module 101 can be implemented in business-to-consumer applications as well as business-to-business applications. Accordingly, user(s) 108 can comprise one or more individual consumers and/or user(s) 108 can comprise one or more businesses. As such, the first media source can be provided socially and/or commercially, as applicable. For example, the first media source can be provided by the respondent(s) at the commission of user(s) 108, such as, for example, where user(s) 108 comprises the one or more businesses. Specifically, the respondent(s) could comprise contestant(s) to a competition sponsored by user(s) 108, respondent(s) to a survey of user(s) 108, submitters of live journal entries, etc. As a result, user(s) 108 could implement system 100 and/or search module 101 as a marketing and/or advertisement tool to predict the habits of the respondent(s) and/or other people.

Figure 3:
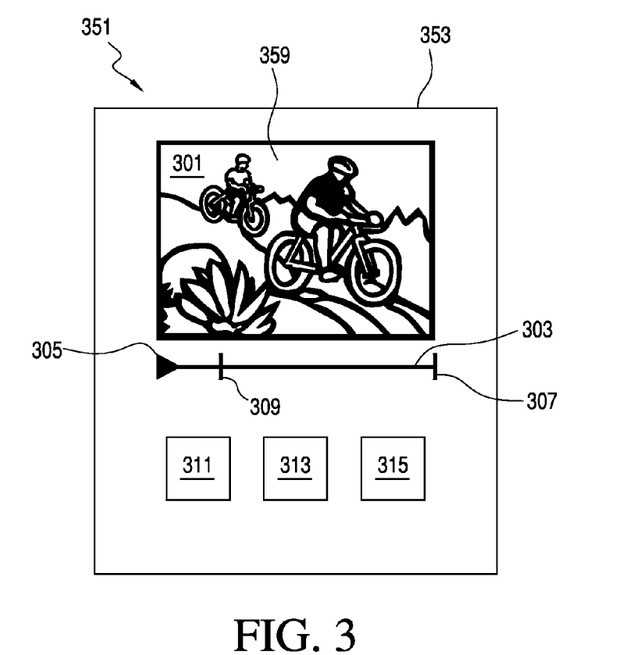
FIG. 3 illustrates a user electronic device operating a search module, according to an embodiment.

Turning ahead again in the drawings, FIG. 3 illustrates user electronic device 353 operating search module 351, according to an embodiment. User electronic device 353 can be similar or identical to user electronic device 103 (FIG. 1), and/or search module 351 can be similar or identical to search module 101 (FIG. 1). User electronic device 353 comprises electronic display 359. Electronic display 359 can be similar or identical to one of output device(s) 109 (FIG. 1). FIG. 3 illustrates electronic display 359 providing video data 301.

Timeline 303 shows a graphical depiction of beginning time 305 and end time 307 of video data 301. Further, marker 309 indicates the current frame of video data 301. Electronic display 359 can be configured to show one or more search targets that the user(s) of user electronic device 353 can interact with to perform a gesture based search. The search target(s) can be similar or identical to the search target(s) describe above with respect to system 100 (FIG. 1). At FIG. 3, the search target(s) comprise three search targets 311, 313, and/or 315. Any other suitable number of search target(s) can be used in other embodiments. Each of search targets 311, 313, 315 corresponds to a related search field category. For example, search target 311 can correspond to a person search field category, search target 313 can correspond to a location search field category, and search target 315 can correspond to an activity search field category. The search target(s) (e.g., search targets 311, 313, and 315) and their related search field categories are subject to change depending on user action, the media, or other criteria.

Figure 4:
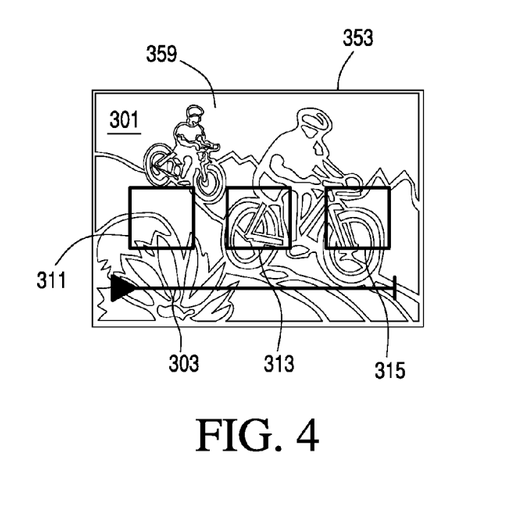
FIG. 4 illustrates an electronic display providing video data at full screen with a timeline and multiple search targets overlaying the video data, according to the embodiment of FIG. 3.
Figure 5:
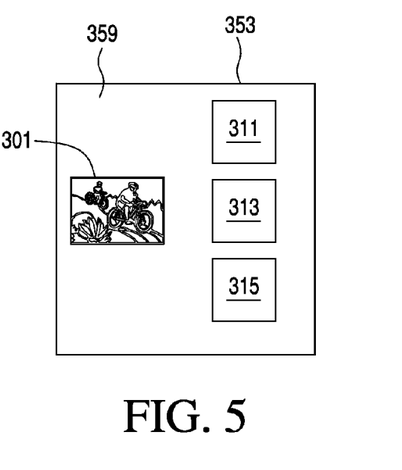
FIG. 5 illustrates an electronic display providing video data as a thumbnail at one portion of an electronic display and multiple search targets at another portion of the electronic display, according to the embodiment of FIG. 3.

Turning to the next drawings, FIG. 4 illustrates electronic display 359 providing video data 301 at full screen with timeline 303 and search targets 311, 313, and 315 overlaying video data 301. Meanwhile, FIG. 5 illustrates electronic display 359 providing video data 301 as a thumbnail at one portion of electronic display 359 and search targets 311, 313, and 315 at another portion of electronic display 359. In some embodiments, timeline 303 can comprise thumbnails of multiple reference points (e.g., frames) within video data 301 with each thumbnail comprising a reference point comprising metadata for that reference point.

Returning again to FIG. 2, in some embodiments, target module 202 can be configured to provide the search target(s) contextually based on the search target type, such as, for example, by providing the search target(s) as part of a map where the search target(s) correspond to their corresponding locations on the map, as opposed the manner as illustrated in FIGS. 3-5.

Figure 6:
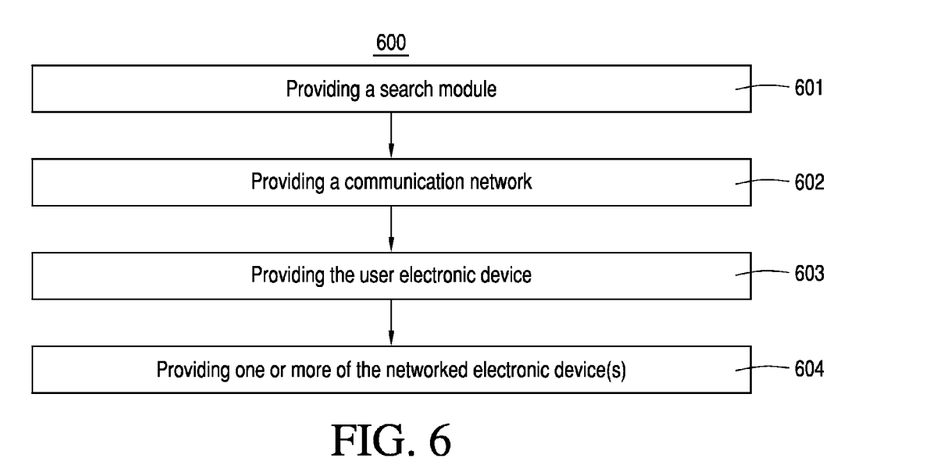
FIG. 6 illustrates a flow chart for an embodiment of a method of providing a system.

Turning ahead again in the drawings, FIG. 6 illustrates a flow chart for an embodiment of method 600 of providing a system. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any other suitable order. In still other embodiments, one or more of the procedures, the processes, and/or the activities in method 600 can be combined or skipped. The system can be similar or identical to system 100 (FIG. 1).

Figure 7:
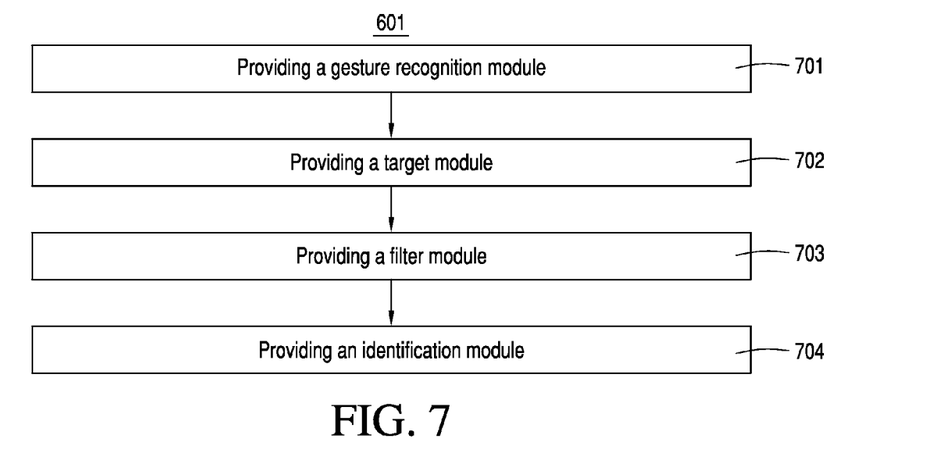
FIG. 7 illustrates a flow chart of an exemplary activity of providing a search module, according to the embodiment of FIG. 6.

Method 600 can comprise activity 601 of providing a search module. The search module can be similar or identical to search module 101 (FIG. 1) and/or search module 351 (FIG. 3). FIG. 7 illustrates an exemplary activity 601.

Activity 601 can comprise activity 701 of providing a gesture recognition module. The gesture recognition module can be similar or identical to gesture recognition module 201 (FIG. 2).

Activity 601 can also comprise activity 702 of providing a target module. The target module can be similar or identical to target module 202 (FIG. 2).

Activity 601 can also comprise activity 703 of providing a filter module. The filter module can be similar or identical to filter module 203 (FIG. 2).

Activity 601 can also comprise activity 704 of providing an identification module. The identification module can be similar or identical to identification module 204 (FIG. 2).

Activity 701 through 704 can be performed in any suitable order, including simultaneously with each other.

Returning now to FIG. 6, method 600 can further comprise activity 602 of configuring the search module to communicate with at least one of (a) a user electronic device or (b) at least one networked electronic device. In some embodiments, performing activity 602 can comprise providing a communication network. The user electronic device can be similar or identical to user electronic device 103 (FIG. 1); the networked electronic device(s) can be similar or identical to networked electronic device(s) 110 (FIG. 1); and/or the communication network can be similar or identical to communication network 107 (FIG. 1).

Method 600 can also comprise activity 603 of providing the user electronic device. In some embodiments, performing activity 603 can comprise performing activity 601. In some embodiments, activity 603 can be omitted.

Method 600 can additionally comprise activity 604 of providing one or more of the networked electronic device(s). In some embodiments, activity 604 can be omitted.

Figure 8:
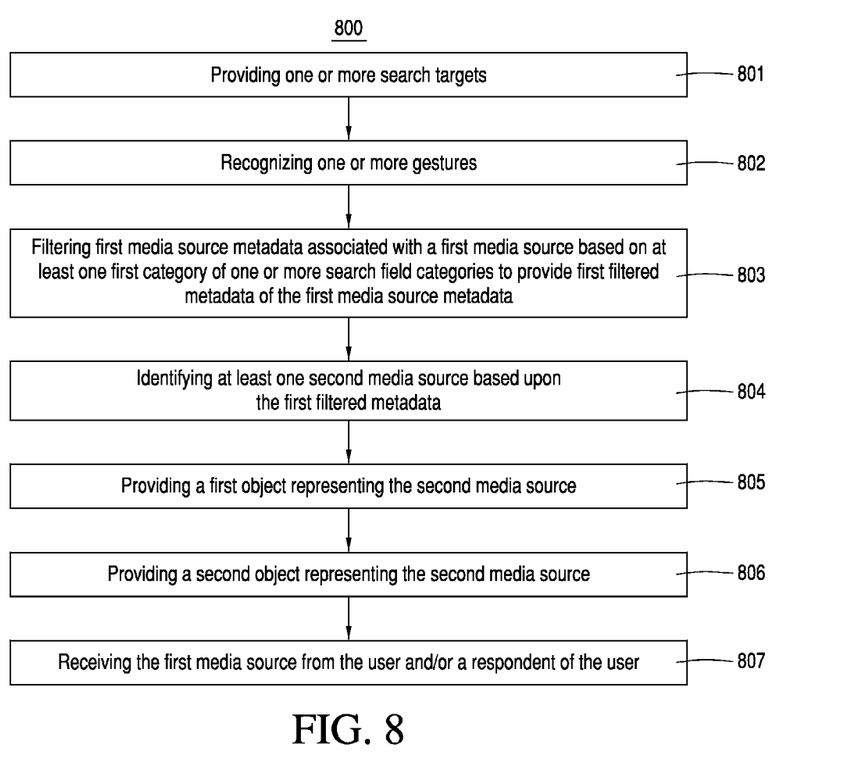
FIG. 8 illustrates a flow chart for an embodiment of a method of gesture based searching.

FIG. 8 illustrates a flow chart for an embodiment of method 800 of gesture based searching. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any other suitable order. In still other embodiments, one or more of the procedures, the processes, and/or the activities in method 800 can be combined or skipped.

In many embodiments, at least part of method 800 can be implemented via execution of computer instructions configured to run at one or more processing modules and configured to be stored at one or more memory storage modules.

Method 800 can comprise activity 801 of providing one or more search targets. The search target(s) can be similar or identical to the search target(s) described above with respect to system 100 (FIG. 1) and/or user electronic device 353 (FIG. 3).

Method 800 can also comprise activity 802 of recognizing one or more gestures. The gesture(s) can be similar or identical to the gesture(s) described above with respect to system 100 (FIG. 1). Accordingly, in some embodiments, performing activity 802 can comprise recognizing (a) at least one motion-based input and/or (b) at least one voice-based input. In many embodiments, activity 802 can be repeated one or more times.

Method 800 can further comprise activity 803 of filtering first media source metadata associated with a first media source based on at least one first category of one or more search field categories to provide first filtered metadata of the first media source metadata. The first media source metadata can be similar or identical to the first media source metadata described above with respect to system 100 (FIG. 1), and the first media source can be similar or identical to the first media source described above with respect to system 100 (FIG. 1). Further, the one or more search field categories can be similar or identical to the one or more search field categories described above with respect to system 100 (FIG. 1).

Method 800 can additionally comprise activity 804 of identifying at least one second media source based upon the first filtered metadata. In many embodiments, performing activity 804 can comprise correlating at least part of the first filtered metadata with at least part of second media source metadata. The second media source(s) can be similar or identical to the second media source(s) described above with respect to system 100 (FIG. 1). In many embodiments, activities 803 and 804 can be repeated whenever activity 802 is repeated.

Method 800 can also comprise activity 805 of providing a first object representing the first media source. The first object can have a similar or identical meaning to the term object as used above with respect to system 100 (FIG. 1). For example, the first object can comprise a thumbnail representing the first media source. In some embodiments, performing activity 805 can comprise providing the first object such that the first media source comprises first image data, first video data, first audio data, and/or first text data, etc. Further, performing activity 805 can comprise providing the first object at a user electronic device. The user electronic device can be similar or identical to user electronic device 103 (FIG. 1). In many embodiments, activity 805 can be performed prior to activities 801, 802, 803, and/or 804.

Method 800 can further comprise activity 806 of providing a second object representing the second media source. Like for the first object, the second object can have a similar or identical meaning to the term object as used above with respect to system 100 (FIG. 1). For example, the second object can comprise a second thumbnail representing the second media source. In some embodiments, performing activity 806 can comprise providing the second object such that the second media source comprises second image data, second video data, second audio data, and/or second text data. Further, performing activity 806 can comprise providing the second object at the user electronic device. In many embodiments, activity 806 can be performed after activity 801, 802, 803, 804, and/or 805.

Method 800 can additionally comprise activity 807 of receiving the first media source from the user and/or a respondent of the user. The user can be similar or identical to user(s) 108 (FIG. 1), and/or the respondent can be similar or identical to the respondent(s) described above with respect to system 100 (FIG. 1). In many embodiments, activity 807 can be performed after activity 801, 802, 803, 804, 805, and/or 806.

Figure 10:
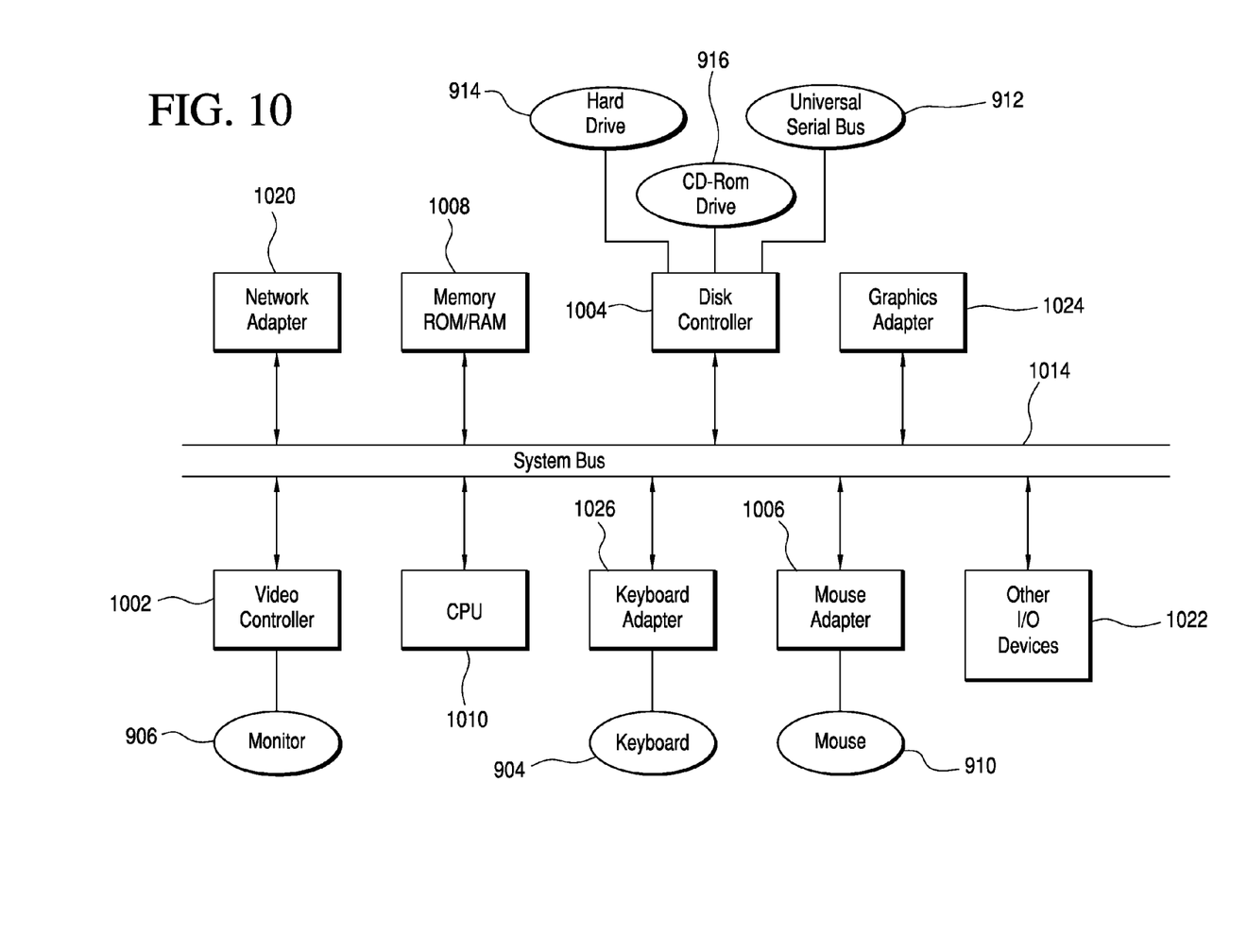
FIG. 10 illustrates a representative block diagram of an example of the elements included in the circuit boards inside a chassis of the computer of FIG. 9.

Turning to the next drawing, FIG. 9 illustrates an exemplary embodiment of computer system 900 that can be suitable for implementing an embodiment of user electronic device 103 (FIG. 1), one or more of networked electronic device(s) 110 (FIG. 1), the cloud computer system(s) referenced with respect to system 100 (FIG. 1) the central computer referenced with respect to system 100 (FIG. 1), user electronic device 353 (FIG. 3), and/or at least part of system 100 (FIG. 1) and/or method 800 (FIG. 8). As an example, a different or separate one of chassis 902 (and its internal components) can be suitable for implementing user electronic device 103 (FIG. 1), one or more of networked electronic device(s) 110 (FIG. 1), the cloud computer system(s) referenced with respect to system 100 (FIG. 1) the central computer referenced with respect to system 100 (FIG. 1), user electronic device 353 (FIG. 3), etc. Furthermore, one or more elements of computer system 900 (e.g., refreshing monitor 906, keyboard 904, and/or mouse 910, etc.) can also be appropriate for implementing some embodiments of user electronic device 103 (FIG. 1), one or more of networked electronic device(s) 110 (FIG. 1), the cloud computer system(s) referenced with respect to system 100 (FIG. 1) the central computer referenced with respect to system 100 (FIG. 1), user electronic device 353 (FIG. 3). Computer system 900 includes chassis 902 containing one or more circuit boards (not shown), Universal Serial Bus (USB) 912, Compact Disc Read-Only Memory (CD-ROM) and/or Digital Video Disc (DVD) drive 916, and hard drive 914. A representative block diagram of the elements included on the circuit boards inside chassis 902 is shown in FIG. 10. Central processing unit (CPU) 1010 in FIG. 10 is coupled to system bus 1014 in FIG. 10. In various embodiments, the architecture of CPU 1010 can be compliant with any of a variety of commercially distributed architecture families.

Continuing with FIG. 10, system bus 1014 also is coupled to memory storage unit 1008, where memory storage unit 1008 can comprise both read only memory (ROM) and random access memory (RAM). Non-volatile portions of memory storage unit 1008 or the ROM can be encoded with a boot code sequence suitable for restoring computer system 900 (FIG. 9) to a functional state after a system reset. In addition, memory storage unit 1008 can comprise microcode such as a Basic Input-Output System (BIOS). In some examples, the one or more memory storage units of the various embodiments disclosed herein can comprise memory storage unit 1008, a USB-equipped electronic device, such as, an external memory storage unit (not shown) coupled to universal serial bus (USB) port 912 (FIGS. 9-10), hard drive 914 (FIGS. 9-10), and/or CD-ROM or DVD drive 916 (FIGS. 9-10). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Examples of common operating systems can include Microsoft® Windows, Mac® operating system (OS), UNIX® OS, and Linux® OS. Where computer system 900 is implemented as a mobile electronic device, common operating systems for a mobile electronic devices can include the iPhone® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows Mobile operating system by Microsoft Corp. of Redmond, Wash., or the Symbian operating system by Nokia Corp. of Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 10, various I/O devices such as disk controller 1004, graphics adapter 1024, video controller 1002, keyboard adapter 1026, mouse adapter 1006, network adapter 1020, and other I/O devices 1022 can be coupled to system bus 1014. Keyboard adapter 1026 and mouse adapter 1006 are coupled to keyboard 904 (FIGS. 9-10) and mouse 910 (FIGS. 9-10), respectively, of computer system 900 (FIG. 9). While graphics adapter 1024 and video controller 1002 are indicated as distinct units in FIG. 10, video controller 1002 can be integrated into graphics adapter 1024, or vice versa in other embodiments. Video controller 1002 is suitable for refreshing monitor 906 (FIGS. 9-10) to display images on a screen 908 (FIG. 9) of computer system 900 (FIG. 9). Disk controller 1004 can control hard drive 914 (FIGS. 9-10), USB port 912 (FIGS. 9-10), and CD-ROM drive 916 (FIGS. 9-10). In other embodiments, distinct units can be used to control each of these devices separately.

In some embodiments, network adapter 1020 can comprise and/or be implemented as a WNIC (wireless network interface controller) card (not shown) plugged or coupled to an expansion port (not shown) in computer system 900 (FIG. 9). In other embodiments, the WNIC card can be a wireless network card built into computer system 900 (FIG. 10). A wireless network adapter can be built into computer system 900 by having wireless communication capabilities integrated into the motherboard chipset (not shown), or implemented via one or more dedicated wireless communication chips (not shown), connected through a PCI (peripheral component interconnector) or a PCI express bus of computer system 900 (FIG. 9) or USB port 912 (FIG. 9). In other embodiments, network adapter 1020 can comprise and/or be implemented as a wired network interface controller card (not shown). Accordingly, communication network 107 (FIG. 1) can comprise a network adapter similar or identical to network adapter 1020.

Although many other components of computer system 900 (FIG. 2) are not shown, such components and their interconnection are well known to those of ordinary skill in the art. Accordingly, further details concerning the construction and composition of computer system 900 and the circuit boards inside chassis 902 (FIG. 9) are not discussed herein.

When computer system 900 in FIG. 9 is running, program instructions stored on a USB-equipped electronic device connected to USB port 912, on a CD-ROM or DVD in CD-ROM and/or DVD drive 916, on hard drive 914, or in memory storage unit 1008 (FIG. 10) are executed by CPU 1010 (FIG. 10). A portion of the program instructions, stored on these devices, can be suitable for carrying out at least part of method 800 (FIG. 8) and implementing one or more components of system 100 (FIG. 1).

Although computer system 900 is illustrated as a desktop computer in FIG. 9, as indicated above, there can be examples where computer system 900 may take a different form factor while still having functional elements similar to those described for computer system 900. In some embodiments, computer system 900 may comprise a single computer, a single server, or a cluster or collection of computers or servers, or a cloud of computers or servers. Typically, a cluster or collection of servers can be used when the demand on computer system 900 exceeds the reasonable capability of a single server or computer, such as, for example, for the central computer system and/or the cloud computer system(s) reference with respect to system 100 (FIG. 1). In many embodiments, the servers in the cluster or collection of servers are interchangeable from the perspective of user electronic device 103 (FIG. 1) and/or networked electronic device(s) 110.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities 601-604 (FIG. 6), activities 701-704 (FIG. 7), and/or activities 801-807 (FIG. 8) may be comprised of many different procedures, processes, and activities and be performed by many different modules, in many different orders, that any element of FIGS. 1-10 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of gesture based searching, at least part of the method being implemented via execution of computer instructions configured to run at one or more processing modules and configured to be stored at one or more memory storage modules, the method comprising:

providing a database comprising (a) a first media source having a first object, the first object having first media source metadata, and (b) at least one second media source, each of the at least one second media source having at least one second object, and each of the at least one second object having second media source metadata, respectively;

executing one or more first computer instructions configured to provide one or more search command targets to a user, the one or more search command targets corresponding respectively to one or more search field categories;

executing one or more second computer instructions configured to recognize one or more gestures of the user, the one or more gestures identifying at least one first search command target of the one or more search command targets and being provided by the user in response to the executing the one or more first computer instructions;

executing one or more third computer instructions configured to filter the at least one second media source based on the first media source metadata and based on at least one first category of the one or more search field categories corresponding to the at least one first search command target; and executing one or more fourth computer instructions configured to identify to the user at least one of the at least one second media source based upon the executing the one or more third computer instructions configured to filter the at least one second media source;

wherein:
the computer instructions comprise the one or more first, one or more second, one or more third, and one or more fourth computer instructions.

2. The method of claim 1 further comprising:
executing one or more fifth computer instructions configured to provide to the user the first media source having the first object;
wherein:
executing the one or more fourth computer instructions comprises executing one or more sixth computer instructions configured to communicate with the database.

3. The method of claim 2 wherein at least one of:
providing the database comprises providing the database such that the first media source comprises at least one of first image data, first video data, first audio data, or first text data;
or
providing the database comprises providing the database such that the at least one second media source comprises at least one of second image data, second video data, second audio data, or second text data that are different from the first image data, the first video data, the first audio data, and the first text data, respectively.

4. The method of claim 2 wherein at least one of:
executing the one or more fifth computer instructions comprises executing one or more seventh computer instructions configured to provide the first media source at a user electronic device of the user;
or
the method further comprises executing one or more eighth computer instructions configured to provide the at least one of the at least one second media source at the user electronic device of the user.

5. The method of claim 1 wherein:
executing the one or more third computer instructions comprises executing one or more fifth computer instructions configured to correlate at least part of the first media source metadata with at least part of the second media source metadata.

6. The method of claim 1 wherein:
executing the one or more second computer instructions comprises executing one or more fifth computer instructions configured to recognize at least one motion-based input of the user provided at a touch screen of a user electronic device; and
the one or more gestures comprise the at least one motion-based input provided at the touch screen of the user electronic device.

7. The method of claim 1 further comprising:
executing one or more fifth computer instructions configured to receive the first media source from at least one of the user or a respondent of the user.

8. The method of claim 1 wherein:
executing the one or more second computer instructions comprises executing one or more fifth computer instructions configured to recognize at least one voice-based input of the user; and
the one or more gestures comprise the at least one voice-based input of the user.

9. A system comprising:
a database comprising (a) a first media source having a first object, the first object having first media source metadata, and (b) at least one second media source, each of the at least one second media source having at least one second object, and each of the at least one second object having second media source metadata, respectively;
a search module, the search module comprising:
a target module configured to provide one or more search command targets to a user of the system, the one or more search command targets corresponding respectively to one or more search field categories;
a gesture recognition module configured to recognize one or more gestures of the user, the one or more gestures identifying at least one first search command target of the one or more search command targets and being provided by the user to select the at least one first search command target;
a filter module configured to filter the at least one second media source based on the first media source metadata and based on at least one first category of the one or more search field categories corresponding to the at least one first search command target; and
an identification module configured to identify to the user at least one of the at least one second media source based upon the filtering of the at least one second media source;
and
a user electronic device comprising at least one output device;
wherein:
the search module is configured to communicate with at least one of: (a) the user electronic device of the user or (b) at least one networked electronic device.

10. The system of claim 9 wherein at least one of:
the first media source is configured to be provided to the user of the system via the at least one output device;
or
the search module is configured to communicate with the database.

11. The system of claim 9 wherein:
the search module is configured to communicate via a communication network with the at least one of: (a) the user electronic device or (b) the at least one networked electronic device.

12. The system of claim 9 wherein:
the user electronic device comprises the search module.

13. The system of claim 9 wherein:
the one or more gestures comprise at least one motion-based input of the user provided at a touch screen of the user electronic device.

14. The system of claim 9 wherein:
the search module is configured to receive the first media source from at least one of the user or a respondent of the user.

15. The system of claim 9 wherein:
the one or more gestures comprise at least one voice-based input of the user.

16. The system of claim 9 wherein:
the at least one output device comprises a touch screen.

17. A method of providing a system, the method comprising:
providing a database comprising a first media source having a first object, the first object having first media source metadata, and comprising at least one second media source, each of the at least one second media source having at least one second object, and each of the at least one one second object having second media source metadata, respectively; and providing a search module, where providing the search module comprises:
- providing a target module configured to provide one or more search command targets to a user of the system, the one or more search command targets corresponding respectively to one or more search field categories;
- providing a gesture recognition module configured to recognize one or more gestures of the user, the one or more gestures identifying at least one first search command target of the one or more search command targets and being provided by the user to select the at least one first search command target;
- providing a filter module configured to filter the at least one second media source based on the first media source metadata and based on at least one first category of the one or more search field categories corresponding to the at least one first search command target; and
- providing an identification module configured to identify to the user at least one of the at least one second media source based upon filtering by the filter module of the at least one second media source.

18. The method of claim 17 further comprising:
configuring the search module to communicate with at least one of:
- a user electronic device of the user;
- or
- at least one networked electronic device.

19. The method of claim 18 further comprising at least one of:
- providing the user electronic device;
- or
- providing at least one first networked electronic device of the at least one networked electronic device.

20. The method of claim 19 wherein:
providing the user electronic device comprises providing the search module.

21. The method of claim 17 wherein:
the one or more gestures comprise at least one motion-based input of the user provided at a touch screen of a user electronic device of the user.

22. The method of claim 17 wherein:
the one or more gestures comprise at least one voice-based input of the user.

* * * * *